United States Patent
Carr

(10) Patent No.: US 9,689,714 B2
(45) Date of Patent: Jun. 27, 2017

(54) MULTIPLEXED FIBER-COUPLED FABRY-PEROT SENSORS AND METHOD THEREFOR

(71) Applicant: Micron Optics, Inc., Atlanta, GA (US)

(72) Inventor: Dustin Wade Carr, Marietta, GA (US)

(73) Assignee: Micron Optics, Inc., Atlanta, GA (US)

( * ) Notice: Subject to any disclaimer, the term of this patent is extended or adjusted under 35 U.S.C. 154(b) by 98 days.

(21) Appl. No.: 14/602,563

(22) Filed: Jan. 22, 2015

(65) Prior Publication Data
US 2015/0204748 A1    Jul. 23, 2015

Related U.S. Application Data

(60) Provisional application No. 61/930,068, filed on Jan. 22, 2014.

(51) Int. Cl.
| | |
|---|---|
| *G01D 5/26* | (2006.01) |
| *G01H 9/00* | (2006.01) |
| *G01L 9/00* | (2006.01) |
| *G01D 5/353* | (2006.01) |

(52) U.S. Cl.
CPC ............ *G01D 5/268* (2013.01); *G01D 5/266* (2013.01); *G01D 5/35306* (2013.01); *G01D 5/35383* (2013.01); *G01H 9/004* (2013.01); *G01L 9/0079* (2013.01)

(58) Field of Classification Search
CPC ............... G01B 11/18; G01D 5/35316; G01D 5/35312; G01D 5/35383; G01D 5/35306; G01H 9/004; G01H 9/006; G01L 1/246; G01L 1/247; G01L 9/0079; G01N 2021/7779

USPC .......................................... 356/477–479, 519
See application file for complete search history.

(56) References Cited

U.S. PATENT DOCUMENTS

| | | | | |
|---|---|---|---|---|
| 5,748,312 A | * | 5/1998 | Kersey ..................... | G01L 1/246 250/227.23 |
| 5,987,197 A | * | 11/1999 | Kersey .................... | G01H 9/004 250/227.23 |
| 6,466,706 B1 | * | 10/2002 | Go ...................... | G01D 5/35303 385/12 |
| 2006/0139652 A1 | * | 6/2006 | Berthold ............ | G01D 5/35303 356/478 |
| 2007/0206202 A1 | * | 9/2007 | Carr ...................... | G01H 9/006 356/519 |

(Continued)

*Primary Examiner* — Michael P Lapage
(74) *Attorney, Agent, or Firm* — Kaplan Breyer Schwarz, LLP

(57) ABSTRACT

A sensor network having a series arrangement of fiber-coupled, reflective sensors is disclosed. In operation, a first light signal having multiple wavelength bands is launched in an upstream direction on a fiber bus. Each sensor includes a wavelength filter and an FP sensor that is sensitive to a parameter. Each wavelength filter (1) selectively passes a different one of the wavelength bands to its FP sensor and (2) reflects the remaining wavelength bands back into the fiber bus to continue upstream. The FP sensor imprints a signal based on the parameter onto its received light and reflects it as a second light signal. The collimator, wavelength filter, and FP sensor of each sensor are arranged such that each second light signal is returned to the fiber bus, which conveys them in a downstream direction to a processor that measures them and estimates the parameter at each sensor.

12 Claims, 7 Drawing Sheets

(56) References Cited

U.S. PATENT DOCUMENTS

| | | | | |
|---|---|---|---|---|
| 2008/0106745 | A1* | 5/2008 | Haber | G01B 11/18 356/519 |
| 2008/0123467 | A1* | 5/2008 | Ronnekleiv | G01D 5/35383 367/20 |
| 2010/0302549 | A1* | 12/2010 | Menezo | G01D 5/35303 356/478 |
| 2013/0148691 | A1* | 6/2013 | Qiu | G01K 11/32 374/161 |

* cited by examiner

MULTIPLEXED FIBER-COUPLED FABRY-PEROT SENSORS AND METHOD THEREFOR

RELATED APPLICATIONS

This application claims the benefit of U.S. Provisional Application No. 61/930,068 filed Jan. 22, 2014. The entire disclosure of U.S. Provisional Application No. 61/930,068 is incorporated herein by reference.

FIELD OF THE INVENTION

The present invention relates to sensors in general, and, more particularly, to optical sensing systems.

BACKGROUND OF THE INVENTION

A sensor is a device that is designed to detect changes in a quantity (i.e., a measurand) and provide a corresponding output. All-optical, fiber-coupled sensors have many advantages over many other conventional sensors (e.g., acoustic sensors, etc.), such as small size and weight, ability to operate in chemically and/or electrically harsh environments, ease of multiplexing large numbers of sensors, and compatibility with fiber-optic networks for data transport and processing. They are therefore attractive for use in many applications.

Such sensor networks often rely upon fiber-Bragg grating ("FBG") sensors to measure a measurand (e.g., temperature and/or strain). It is relatively easy to integrate multiple FBG sensors in a single-fiber network because each sensor has only a limited number of operating wavelengths. Prior-art FBG sensor systems usually employ swept-wavelength sources so that all of the sensors in the network can be interrogated by a single source. Although easy to implement, the dynamic range of a typical FBG sensor is relatively poor and this has limited their deployment in many applications.

Fabry-Perot ("FP") cavity-based sensors are often used in applications in which the limitations of FBG sensors are not easily overcome. FP sensors are widely used, for example, in many optical-sensor-based accelerometer and pressure sensing applications. But FP sensors are not without their own limitations. For instance, it is challenging to multiplex FP sensors in a single-fiber network because of inter-sensor interference.

An optical-sensor based network that has high dynamic range and is easily implemented would provide an attractive alternative to sensor networks known in the prior art.

SUMMARY OF THE INVENTION

The present invention enables a sensor network without some of the costs and disadvantages of the prior art. An embodiment of the present invention includes one or more FP sensors, where each FP sensor is operatively coupled with a wavelength-selective filter that limits the wavelengths upon which the FP sensor operates. As a result, a single-fiber network can include multiple sensors without giving rise to inter-sensor interference that can degrade the signal-to-noise ratio of the system.

An illustrative embodiment of the present invention includes a light source that launches a range of wavelengths, comprising a plurality of wavelength bands, onto an optical fiber bus (hereinafter referred to as a "fiber bus") to which a plurality of sensors is optically coupled. Each sensor operates in reflection mode to reflect a signal back into the fiber bus, where the reflected signal from each sensor is within a different wavelength band that is uniquely identified with that sensor. A wavelength-response function for each sensor is then determined from its respective reflected signal and analyzed to determine a value for the measurand for which that sensor is sensitive. In some embodiments, each of the sensors is sensitive for the same measurand. In some embodiments, at least one of the sensors is sensitive for a first measurand and at least one of sensors is sensitive for a second measurand.

Each sensor includes a Fabry-Perot cavity that is optically coupled with a reflective wavelength filter, where each of the wavelength filters is selectively transmissive for a different one of the plurality of wavelength bands. As a result, each of the Fabry-Perot cavities receives a different one of the plurality of wavelength bands. At each sensor, the wavelength filter is optically coupled with the fiber bus via a serially coupled dual-fiber collimator. The collimator receives light from the source on a first fiber portion and couples light reflected from the wavelength filter into a second fiber portion. Light reflected by the wavelength filter returns through the second fiber portion to the fiber bus, which conveys the reflected light to the next sensor in line.

Light transmitted by the wavelength filter is received by the Fabry-Perot cavity, which reflects a portion of this light. The (light) signal reflected from the cavity is based on its cavity length, which is a function of the magnitude of the measurand for which that sensor is sensitive. The Fabry-Perot cavity and the wavelength filter are arranged such that this reflected signal returns through the first fiber portion to the fiber bus, which then conveys the reflected signal to a receiver and processor.

The receiver receives the reflected signal from each sensor in a different wavelength band and the processor processes each received reflected signal to determine the wavelength at which a minima occurs in its respective wavelength band. The spectral position of each minima is then used to determine the cavity length of each Fabry-Perot cavity and, thus, a value for the measurand of interest at each sensor.

In some embodiments, the light source is a swept-wavelength source. In some other embodiments, the light source is a broadband source.

A method in accordance with the present invention is suitable for measuring the wavelength-response function for each sensor and dynamically determining the magnitude of the measurand being measured by each sensor. In some embodiments, the method comprises processing a light signal reflected by a sensor and determining the wavelength at which the light signal exhibits a minima. The method further determines the cavity length of the Fabry-Perot cavity included in the sensor and estimates a magnitude for its respective measurand based on this cavity length. Changes in the wavelength are then monitored and used to determine changes in the measurand over time.

An embodiment of the present invention is a sensor network comprising: (1) a source, the source being operative for providing a first light signal that includes a first plurality of wavelength bands; (2) a fiber bus; and (3) a plurality of sensors, each sensor being a reflective sensor that is optically coupled with the fiber bus, and each sensor comprising; (a) a wavelength filter; and (b) a Fabry-Perot (FP) sensor that is optically coupled with the wavelength filter, the FP sensor being sensitive for one of a plurality of measurands; wherein each wavelength filter of the plurality thereof is operative for selectively providing a different one of a second plurality of wavelength bands to its respective FP sensor, and wherein the first plurality of wavelength bands includes the second plurality of wavelength bands.

DETAILED DESCRIPTION

Figure 1:
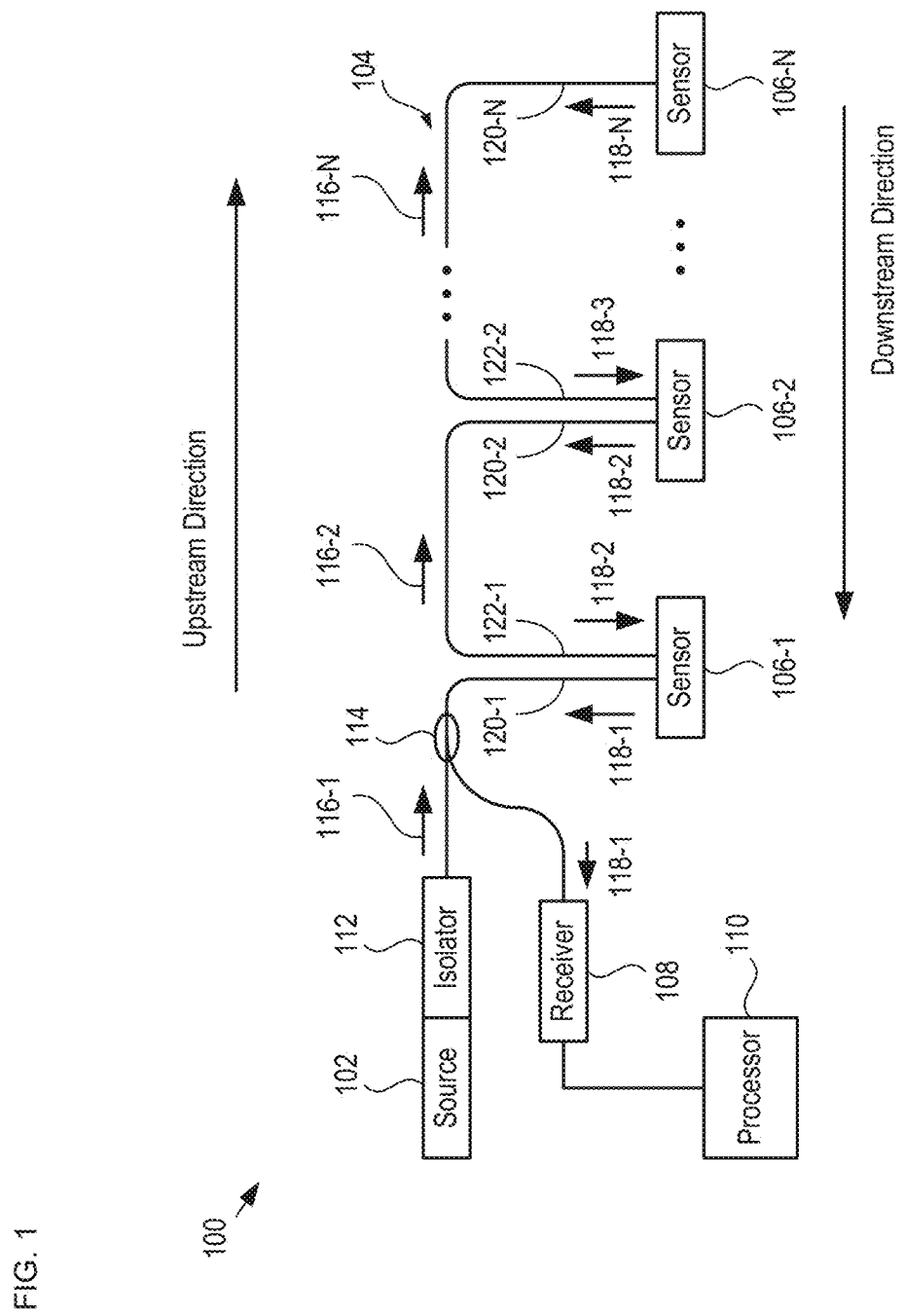
FIG. 1 depicts a schematic drawing of a sensor network in accordance with an illustrative embodiment of the present invention.

FIG. 1 depicts a schematic drawing of a sensor network in accordance with an illustrative embodiment of the present invention. Network 100 is a distributed pressure-sensor network operative for providing a spatial map of pressure based on measurements made at N locations. In some embodiments, network 100 is operative for monitoring a plurality of measurands at one or more locations. In some embodiments, network 100 is operative for monitoring one or more measurands at one or more locations. For the purposes of this Specification, including the appended claims, a "measurand" is defined as the quantity measured by a sensor.

Network 100 includes source 102, fiber bus 104, sensors 106-1 through 106-N, receiver 108, and processor 110, interrelated as shown. It will be clear to one skilled in the art, after reading this Specification, how to specify, make, and use alternative embodiments wherein a network includes any practical number of sensors.

Figure 2:
FIG. 2 depicts operations of a method for measuring a measurand in accordance with the illustrative embodiment of the present invention.

FIG. 2 depicts operations of a method for measuring a measurand in accordance with the illustrative embodiment of the present invention. Method 200 begins with operation 201, wherein light signal 116-1 is provided on fiber bus 104. Method 200 is described herein with continuing reference to FIG. 1, as well as to FIGS. 3-7.

Source 100 is a broadband source that provides light signal 116-1 to fiber bus 104 via isolator 112. Light signal 116-1 has a spectral width greater than or equal to the combined wavelength range of sensors 106-1 through 106-N (referred to, collectively, as sensors 106). As a result, light signal 116-1 includes light within N wavelength bands (i.e., wavelength bands $\lambda 1$ through $\lambda N$), where each wavelength band spans at least one free-spectral range of the FP sensor included in a corresponding sensor 106, as discussed below and with respect to operation 206. In some embodiments, source 100 is a swept-wavelength source that sweeps the wavelength of light signal 116-1 through a range of wavelengths equal or greater than the combined wavelength range of sensors 106.

At operation 202, for each of i=1 through N, sensor 106-$i$ receives light signal 116-$i$.

Figure 3:
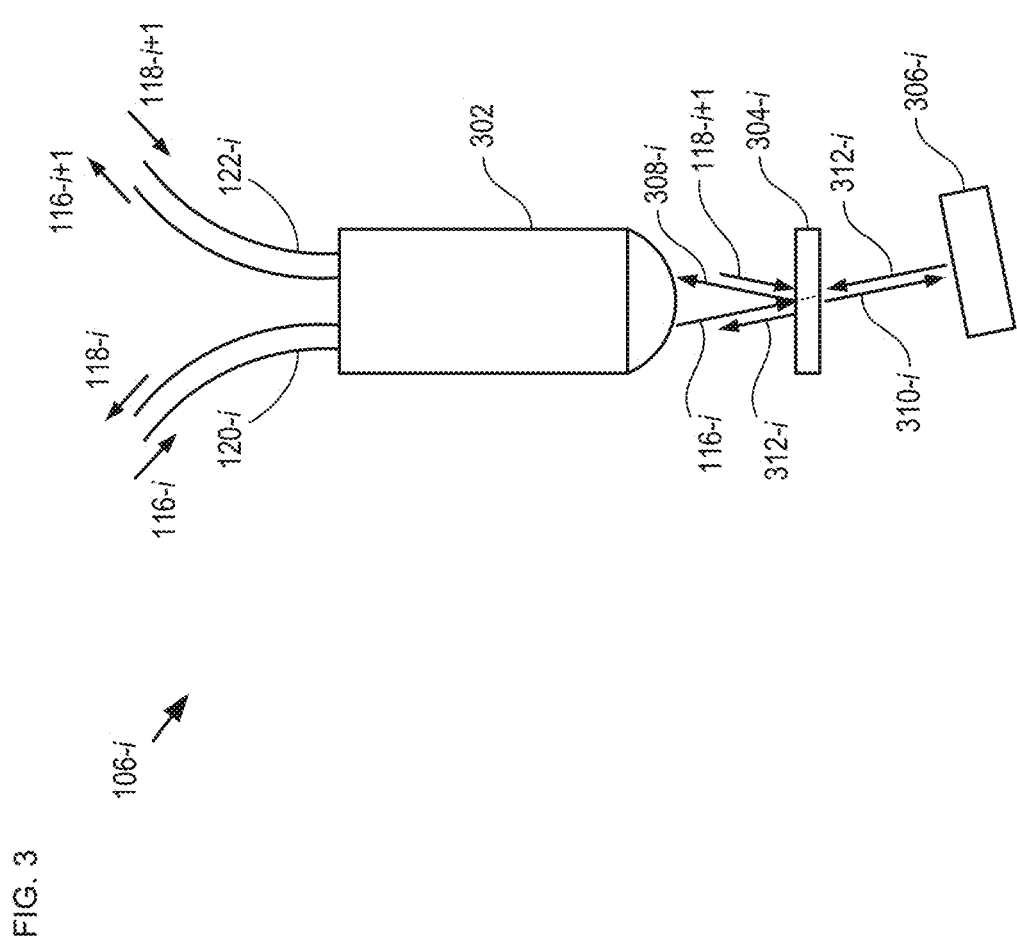
FIG. 3 depicts a sensor in accordance with the illustrative embodiment of the present invention.

FIG. 3 depicts a sensor in accordance with the illustrative embodiment of the present invention. Sensor 106-$i$ is representative of each of sensors 106. Sensor 106-$i$ comprises input fiber portion 120-$i$ and output fiber portion 122-$i$, collimator 302, wavelength filter 304-$i$, and FP sensor 306-$i$. In the illustrative embodiment, each of sensors 106 is operative for sensing pressure. In some embodiments, at least one of sensors 106 is operative for measuring a different measurand, such as strain, acceleration, gravity, the presence of a chemical, temperature, magnetic field, and the like. In some embodiments, each of sensors 106 is operative for measuring a different measurand.

Light signal 116-$i$ is conveyed to collimator 302 via input fiber portion 120-$i$. It should be noted that each light signal 116-$i$ includes all of the wavelength bands in light signal 116-1 except for those removed by the wavelength filters of each upstream sensors 106, as discussed below and with respect to operation 204.

Collimator 302 is a conventional dual-fiber collimator suitable for use in the wavelength range of light signal 116-1. Collimator is optically coupled with input fiber portion 120-$i$ and output fiber portion 122-$i$ such that the collimator operates in pupil-division mode.

Collimator 302 provides light signal 116-$i$ to wavelength filter 304-$i$.

Wavelength filter 304-$i$ is a thin-film wavelength filter that selectively passes wavelength band $\lambda i$ to FP sensor 306-$i$ as light signal 310-$i$ and reflects the remaining light in light signal 116-$i$ back into collimator 302 as light signal 308-$i$. Light signal 308-$i$ is then coupled back into fiber bus 104 as light signal 116-$i$+1 via output fiber portion 122-$i$.

Because wavelength filter 304-$i$ passed wavelength band $\lambda i$ to FP sensor 306-$i$, light signal 116-$i$+1 no longer contains this wavelength band. In other words, as light signal 116 travels upstream through the series of sensors 106, it contains fewer of the wavelength bands originally contained in light signal 116-1. For example, light signal 116-1 includes all of wavelength bands $\lambda 1$ through $\lambda N$ when it arrives at sensor 106-1. After passing through sensor 106-1, however, light signal 116-2 contains only wavelength bands $\lambda 2$ through $\lambda N$. This process continues at each successive sensor along fiber bus 104 until light signal 116 reaches sensor 106-N, at which it contains only wavelength band $\lambda N$.

FP sensor 306-$i$, wavelength filter 304-$i$ and collimator 302 are arranged such that FP sensor 306-$i$ reflects a portion of light signal 310-$i$ as light signal 312-$i$, which is coupled back into collimator 302 through the wavelength filter. Collimator 302 then couples light signal 312-$i$ into input fiber portion 120-$i$.

At operation 203, FP sensor 306-$i$ imparts a signal onto light signal 312-$i$, where the signal depends on the pressure sensed by sensor 106-$i$.

Figure 4:
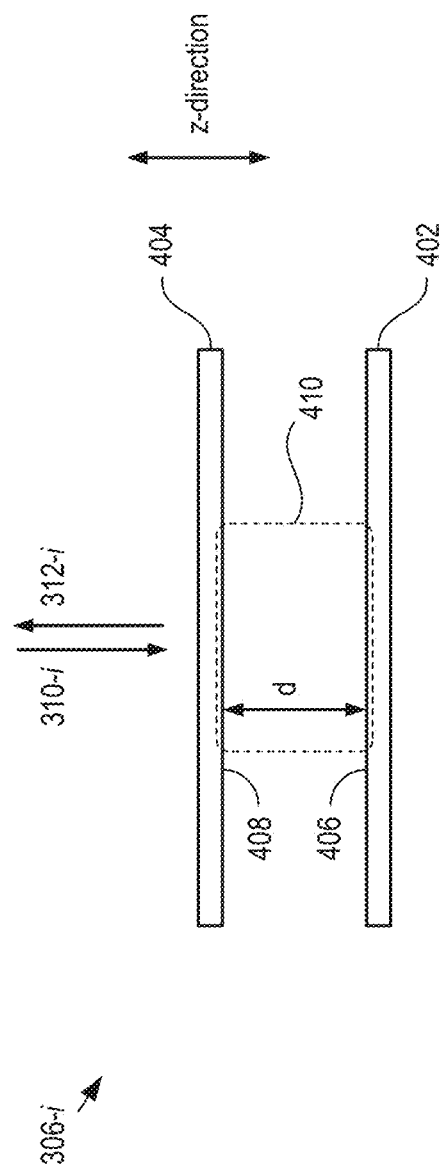
FIG. 4 depicts a schematic drawing of a side view of an FP sensor in accordance with the illustrative embodiment of the present invention.

FIG. 4 depicts a schematic drawing of a side view of an FP sensor in accordance with the illustrative embodiment of the present invention. FP sensor 306-$i$ includes stationary layer 402 and movable layer 404.

Stationary layer 402 is a partially reflective mirror layer having reflectance of 50%. Stationary layer 402 includes surface 406.

Movable layer 404 is a partially reflective mirror layer having reflectance of 50% for the wavelengths in light signal 116-1. Movable layer 404 includes surface 408.

Surfaces 406 and 408 collectively define optically resonant cavity 410, which has a cavity length, d, equal to the separation between these surfaces. One skilled in the art will recognize that the response of optically resonant cavity 410 depends on the reflectance of the two mirrors that form the optical cavity, and cavity length, d, as follows:

$$T = \frac{1}{1 - F\sin^2\frac{\phi}{2}}$$

$$R = 1 - T$$

$$F = \frac{4R_0}{(1 - R_0)^2}$$

$$\phi = \frac{4\pi d}{\lambda}$$

where T is the transmitted fraction of light, R is the reflected fraction, $R_0$ is the reflectance of each mirror in the cavity, d is the distance between the mirrors (i.e., cavity length), and $\lambda$ is the wavelength of the light.

Movable layer 404 is held above stationary layer 402 such that its position along the z-direction is based on magnitude of the measurand for which sensor 106-$i$ is sensitive (i.e., in this example, pressure). As a result, cavity length, d, is a function of pressure and the wavelength-response function (WRF) of reflected light signal 312-$i$ is, therefore, indicative of the pressure at sensor 106-$i$.

One skilled in the art will recognize that there are myriad ways in which movable layer 404 can be supported/suspended above stationary layer 402 and that the support/suspension means will depend on the measurand being sensed by the FP sensor and/or the desired sensor sensitivity. Examples of optically resonant cavities having a movable layer are disclosed in U.S. Pat. Nos. 7,355,723, 7,583,390, 7,359,067, 7,551,295, and 7,626,707, each of which is incorporated herein in its entirety. Further, it should be noted that the design of FP sensor 306-$i$ is merely exemplary and that alternative design characteristics, such as $R_0$, d, $\lambda$, etc., are within the scope of the present invention.

Although the illustrative embodiment includes an FP sensor whose cavity length is sensitive to pressure, it will be clear to one skilled in the art, after reading this Specification, how to specify, make, and use alternative embodiments of the present invention wherein cavity length, d, is sensitive to any of a plurality of measurands that includes acceleration, motion, temperature, strain, force, density, angle, a chemical or biological component, light, radiation, gas flow, mass flow, nuclear energy, magnetic field, gravity, humidity, moisture, vibration, electrical fields, sound, or any other physical aspect of an environment.

Figure 5:
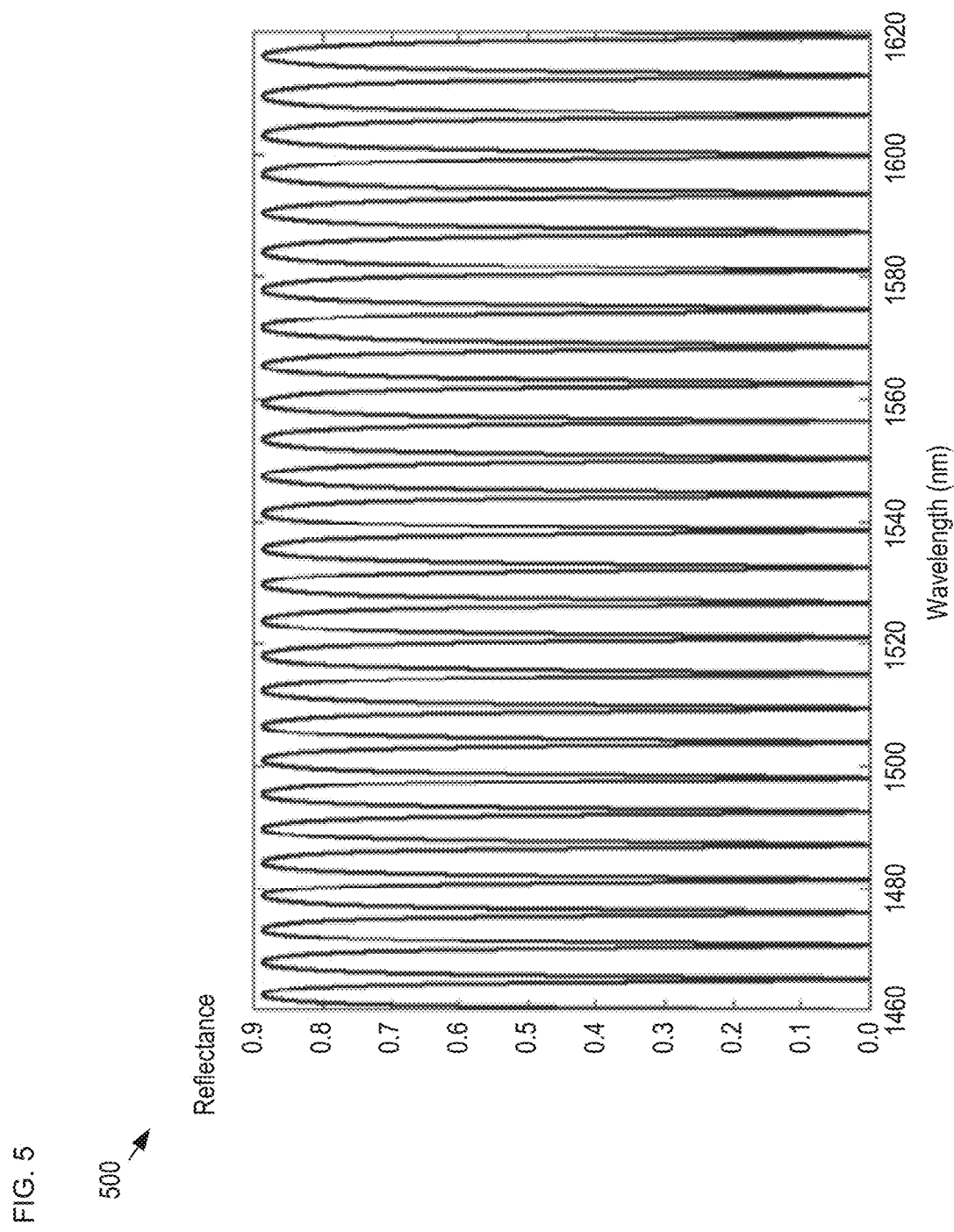
FIG. 5 depicts a typical theoretical response function of an FP sensor in accordance with the illustrative embodiment of the present invention.

FIG. 5 depicts a typical theoretical response function of an FP sensor in accordance with the illustrative embodiment of the present invention. Plot 500 shows the intensity of light signal 312-$i$ for an exemplary FP sensor 306-$i$ having a cavity length of 200 microns and mirror reflectance of 50%.

At operation 204, sensor 106-$i$ couples light signal 118-$i$ into fiber bus 104.

Light signal 118-$i$ includes light signal 312-$i$ as well as light signal 118-$i+1$, which is received from upstream sensor 106-$i+1$ and combined with light signal 312-$i$ at wavelength filter 304-$i$.

It should be noted that, as light signal 118 travels along the downstream direction through the series of sensors 106, it contains more of the wavelength bands originally contained in light signal 116-1 since, at each sensor 106-$i$, a reflected portion 312-$i$ is added to light signal 118-$i+1$. For example, light signal 118-3 includes all of wavelength bands $\lambda 3$ through $\lambda N$ when it arrives at sensor 106-2. After passing through sensor 106-2, however, light signal 312-2, which contains wavelength band $\lambda 2$, is combined with light signal 118-3 to form light signal 118-2. As a result, light signal 118-2 includes all of wavelength bands $\lambda 2$ through $\lambda N$ when it arrives at sensor 106-1, where wavelength band $\lambda 1$ is added to it to form light signal 118-1. As a result, light signal 118-1 includes all of the wavelength bands of contained in light signal 116-1, as originally provided by source 102; however, each wavelength band is now dependent upon the measurand sensed by each of the sensors.

At operation 205, light signal 118-1 is provided to receiver 108.

Figure 6:
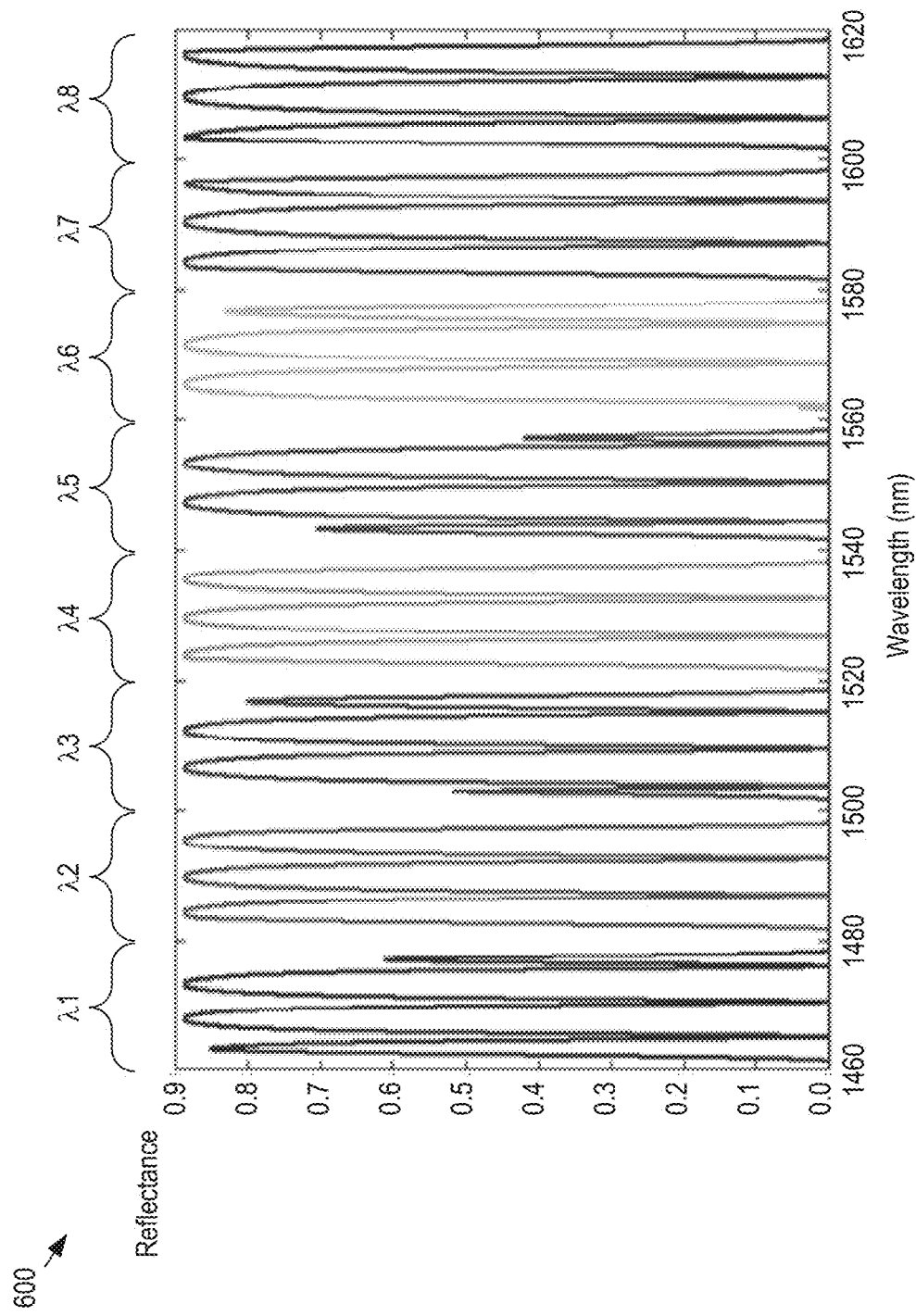
FIG. 6 depicts a typical theoretical response function of a sensor in accordance with the present invention.

FIG. 6 depicts a typical theoretical response function of a sensor in accordance with the present invention. Plot 600 shows the intensity of light signal 118-1 for a network that includes eight sensors 106, where all of the FP sensors 306 have substantially the same response but wavelength filters 304 have a spectral bandwidth of approximately 15 nm and are sequentially offset in wavelength by approximately 20 nm. It should be noted that in reality, some deviation from the ideal would be expected due to losses in the fiber and connectors, etc.

At operation 206, processor 110 processes the output of receiver 108 to measure the wavelength-response function at each of sensors 106 and determine a value for the pressure at each of the sensors.

In order to determine the pressure at each sensor, processor 110 calculates a real-time estimate of the fluctuations in the FP optical cavity length. It should be noted that in order to do this, the spectral bandwidth of each of wavelength filters 304 must be at least the size of one free-spectral range its respective FP sensor 306. One skilled in the art will recognize that the free-spectral range is given by the distance between neighboring reflectance minima in the WRF. A spectral bandwidth of at least one FSR ensures that there will always be one or more minima within the filtered region of each sensor. If changes in the FP sensor result in a minima moving beyond the range of the filter, then another minima will appear on the other side of the filter window. As such, it is possible to always use the positions of these peaks to generate an estimate of the sensor cavity length.

Processor 110 measures the fluctuations in the cavity lengths of the FP sensors by detecting the minima in their respective reflectance functions. The positions of these can be determined by any of a number of methods that are used to detect peaks or valleys in spectral functions. The positions of these minima are determined by the relation:

$$\lambda_n = \frac{2d}{n}$$

where the integer n is called the "order" of the given minima. In the proposed approach, there is one or more minima within each filter window. Once the positions of the minima are determined, these positions are tracked over time to provide a measure of the cavity length. As long as the position of a given order does not vary by more than ½ of a FSR between samples, the individual orders can easily be tracked.

Figure 7A:
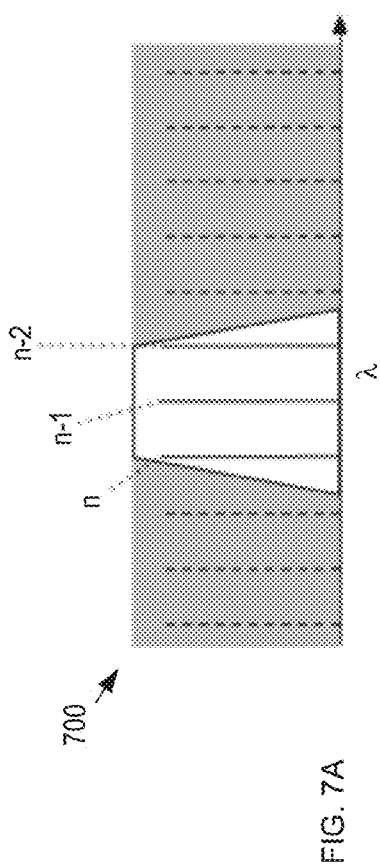
FIGS. 7A-C depict plots of minima in the wavelength-response function of a sensor detected at three different times in accordance with the illustrative embodiment of the present invention.
Figure 7B:
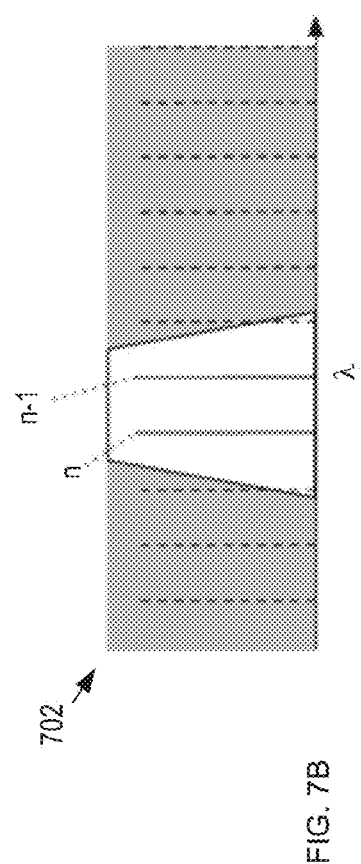
Figure 7C:
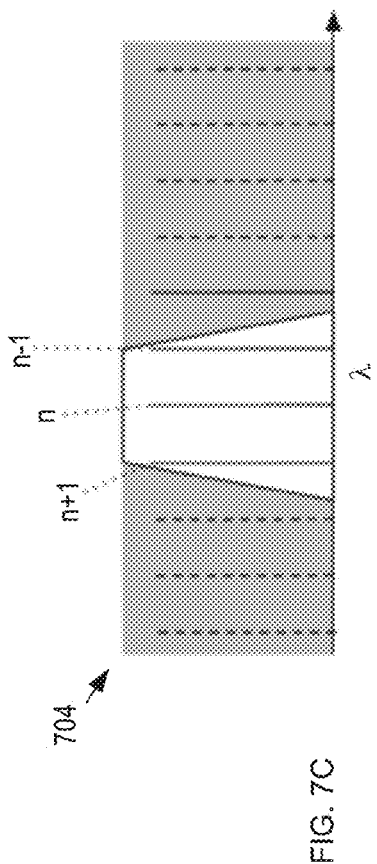

FIGS. 7A-C depict plots of minima in the wavelength-response function of a sensor detected at three different times in accordance with the illustrative embodiment of the present invention. Plots 700, 702, and 704 show three different time samples wherein the wavelength of the respective orders has changed due to changes in the optical cavity length. It can be seen that, as long as the change is less than one half of one free-spectral range, the orders can be readily tracked as they come and go within a given filter window.

In some embodiments of the present invention, sensors 106 are combined with a plurality of fiber-Bragg grating-based sensors in series. It should be noted, however, that in such embodiments, the FBG sensors must be active for wavelengths that are outside the passband of any of wavelength filters 304.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A sensor network comprising:
   (1) a fiber bus comprising a first input fiber portion and a first output fiber portion; and
   (2) a first sensor that is a reflective sensor, the first sensor being optically coupled with each of the first input and output fiber portions, wherein the first sensor comprises;
      (a) a first collimator that is dimensioned and arranged to: (i) provide a first light signal received from the first input fiber portion to a first wavelength filter as a free-space light signal, the first light signal including a first plurality of wavelength bands; (ii) couple a second light signal received from the first wavelength filter as a free-space light signal into the first output fiber portion; and (iii) couple a third light signal received from the wavelength filter as a free-space light signal into the first input fiber portion;
      (b) the first wavelength filter, the first wavelength filter being dimensioned and arranged to: (i) selectively pass a first wavelength band of the first plurality thereof to a first Fabry-Perot (FP) sensor while reflecting the remainder of the first plurality of wavelength bands as a second plurality of wavelength bands that defines the second light signal; and (ii) pass a fourth light signal received from the first FP sensor to the first collimator as the third light signal; and
      (c) the first Fabry-Perot (FP) sensor, the first FP sensor being dimensioned and arranged to reflect at least a portion of the first wavelength band back to the first wavelength filter as the fourth light signal, the magnitude of the fourth light signal being based on a first measurand of a plurality of measurands.

2. The sensor network of claim 1 further comprising:
   (3) a second input fiber portion that is optically coupled with the first output fiber portion, the fiber bus including the second input fiber portion;
   (4) a second sensor that is a reflective sensor, the second sensor being optically coupled with the second input fiber portion, wherein the second sensor comprises;
      (a) a second collimator that is dimensioned and arranged to (i) provide the second light signal received from the second input fiber portion to a second wavelength filter as a free-space light signal and (ii) couple a fifth light signal received from the second wavelength filter as a free-space light signal into the second input fiber portion;
      (b) the second wavelength filter, the second wavelength filter being dimensioned and arranged to: (i) selectively pass a second wavelength band of the second plurality thereof to a second FP sensor; and (ii) pass a sixth light signal received from the second FP sensor to the second collimator as the fifth light signal; and
      (c) the second Fabry-Perot (FP) sensor, the second FP sensor being dimensioned and arranged to reflect at least a portion of the second wavelength band back to the second wavelength filter as the sixth light signal, the magnitude of the sixth light signal being based on a second measurand of the plurality thereof.

3. The sensor network of claim 2 wherein the first measurand and the second measurand are the same measurand.

4. The sensor network of claim 1 further comprising (3) a processor that is operative for (i) determining the characteristics of a first wavelength-response function of the first sensor and (ii) determining a magnitude of the first measurand based on the first wavelength-response function.

5. The sensor network of claim 1 wherein the FP sensor of the first sensor is characterized by a first free-spectral range, and wherein the first wavelength filter has a spectral bandwidth equal to or greater than the first free-spectral range.

6. The sensor network of claim 1 further comprising (3) a source that is operative for providing the first light signal.

7. The sensor network of claim 6 wherein the source comprises a swept-wavelength light source.

8. The sensor network of claim 1 wherein the first FP sensor includes a first mirror and a second mirror that collectively define a first cavity length, and wherein the first mirror is dimensioned and arrange to move in response to the first measurand such that the first cavity length is dependent upon the first measurand.

9. A method for measuring a property, the method comprising:
   conveying a first light signal in a first direction on a fiber bus that includes a plurality of optical fibers, each optical fiber having at least one of an input fiber portion and an output fiber portion, wherein the first light signal includes a first wavelength band and a second wavelength band;
   receiving the first light signal at a first sensor that is a reflective sensor that includes a first wavelength filter and a first Fabry-Perot (FP) sensor, wherein the first sensor is optically coupled to the fiber bus with a first optical collimator;
   selectively passing the first wavelength band through the first wavelength filter to the first FP sensor;
   reflecting the second wavelength band at the first wavelength filter such that the second wavelength band is coupled back into the fiber bus and conveyed to a second sensor that is a reflective sensor;
   modulating the first wavelength band at the first FP sensor based on a first measurand;
   coupling the modulated first wavelength band into the fiber bus;
   receiving the second wavelength band at the second sensor, the second sensor including a second wavelength filter and a second FP sensor, wherein the second sensor is optically coupled to the fiber bus with a second optical collimator;
   selectively passing the second wavelength band through the second wavelength filter to the second FP sensor;
   modulating the second wavelength band at the second FP sensor based on a second measurand; and coupling the modulated second wavelength band back into the fiber bus.

10. The method of claim 9 further comprising:
determining the magnitude of the first measurand based on the modulated first wavelength band; and
determining the magnitude of the second measurand based on the modulated second wavelength band.

11. The method of claim 9 further comprising:
providing the first sensor such that the first FP sensor includes a first resonant cavity whose cavity length is based on the magnitude of the first measurand; and
providing the second sensor such that the second FP sensor includes a second resonant cavity whose cavity length is based on the magnitude of the second measurand.

12. The method of claim 9 wherein the first measurand and second measurand are the same measurand.

\* \* \* \* \*